(12) United States Patent
Zhuo et al.

(10) Patent No.: US 10,680,526 B2
(45) Date of Patent: Jun. 9, 2020

(54) POWER TRANSFER AND FEEDBACK ACROSS A COMMON ISOLATOR

(71) Applicant: Analog Devices Global, Hamilton (BM)

(72) Inventors: Yue Zhuo, Beijing (CN); Baoxing Chen, Westford, MA (US); Xin Yang, Beijing (CN); Tianting Zhao, Beijing (CN)

(73) Assignee: Analog Devices Global, Hamilton (BM)

( * ) Notice: Subject to any disclaimer, the term of this patent is extended or adjusted under 35 U.S.C. 154(b) by 0 days.

(21) Appl. No.: 15/406,014

(22) Filed: Jan. 13, 2017

(65) Prior Publication Data

US 2018/0205319 A1    Jul. 19, 2018

(51) Int. Cl.
*H02M 3/335* (2006.01)
(52) U.S. Cl.
CPC .............................. *H02M 3/33523* (2013.01)
(58) Field of Classification Search
CPC ............ H02M 3/335; H02M 3/33507; H02M 3/33515; H02M 3/33523
See application file for complete search history.

(56) References Cited

U.S. PATENT DOCUMENTS

| 4,402,039 | A | 8/1983 | Jirka |
| 6,091,779 | A | 7/2000 | Griessbach |
| 7,558,080 | B2 | 7/2009 | Chen et al. |
| 8,576,587 | B2 * | 11/2013 | Hsu .................. H02M 1/32 363/21.06 |
| 9,985,548 | B2 * | 5/2018 | Lin ................ H02M 3/33592 |
| 2003/0042571 | A1 * | 3/2003 | Chen .................. H01F 17/0006 257/531 |
| 2006/0120115 | A1 | 6/2006 | Chen et al. |
| 2009/0196074 | A1 * | 8/2009 | Choi .................... H02M 3/337 363/21.02 |

(Continued)

FOREIGN PATENT DOCUMENTS

| CN | 101189786 A | 5/2008 |
| CN | 101965686 A | 2/2011 |

(Continued)

OTHER PUBLICATIONS

Biela et al., Bi-Directional Isolated DC-DC Converter for Next-Generation Power Distribution-Comparison of Converters using Si and SiC Devices. IEEJ Trans.128-D. 2008;128(7):1-10.

(Continued)

*Primary Examiner* — Gary L Laxton
(74) *Attorney, Agent, or Firm* — Wolf, Greenfield & Sacks, P.C.

(57) ABSTRACT

Isolated DC-DC converters are described. A DC-DC converter is a device which converts a direct current (DC) signal from one voltage to another. An isolated DC-DC converter performs the conversion across an electrical isolation barrier separating two voltage domains. The signal converted from one voltage to another, and transferred from one voltage domain to another, may be a power signal. Described are isolated DC-DC converters which transfer a power signal from one voltage domain to another via an isolator, and a power feedback signal back across the isolator. The isolator is a transformer in some situations.

18 Claims, 7 Drawing Sheets

(56) References Cited

U.S. PATENT DOCUMENTS

| | | | |
|---|---|---|---|
| 2009/0212759 A1* | 8/2009 | Melanson | H03M 3/41 |
| | | | 324/76.11 |
| 2013/0155728 A1* | 6/2013 | Melanson | H02M 1/44 |
| | | | 363/21.16 |
| 2013/0229829 A1 | 9/2013 | Zhang et al. | |
| 2013/0235620 A1 | 9/2013 | Morris et al. | |
| 2014/0098578 A1* | 4/2014 | Halberstadt | H02M 3/33515 |
| | | | 363/21.15 |
| 2014/0268919 A1* | 9/2014 | Yao | H02M 3/33523 |
| | | | 363/21.15 |
| 2015/0180528 A1 | 6/2015 | Ragonese et al. | |
| 2016/0111961 A1* | 4/2016 | Balakrishnan | H02M 3/33507 |
| | | | 363/21.12 |
| 2016/0226383 A1 | 8/2016 | Hayakawa et al. | |
| 2016/0261200 A1 | 9/2016 | Yabuzaki | |
| 2016/0301314 A1* | 10/2016 | Polivka | H02M 3/33507 |
| 2017/0244332 A1* | 8/2017 | Leong | H02M 3/33523 |
| 2018/0205319 A1 | 7/2018 | Zhuo et al. | |

FOREIGN PATENT DOCUMENTS

| | | |
|---|---|---|
| CN | 103548282 A | 1/2014 |
| CN | 103715910 A | 4/2014 |
| CN | 105610306 A | 5/2016 |
| CN | 106160418 A | 11/2016 |
| DE | 10 2013 003 429 A1 | 9/2013 |
| JP | H10215208 A | 8/1998 |
| JP | 2002-010634 A | 1/2002 |
| JP | 2009524397 A | 6/2009 |
| JP | 2010-288404 A | 12/2010 |
| WO | WO 2007/084506 A2 | 7/2007 |

OTHER PUBLICATIONS

Chen_Inside iCoupler® Technology: isoPower® Explainer. Analog Devices. 2010; 2 pages.

Inoue et al., A Bidirectional Isolated DC-DC Converter as a Core Circuit of the Next-Generation Medium-Voltage Power Conversion System. IEEE Transactions on Power Electronics. 2007; 22(2):535-42.

[No Author Listed], Dual-Channel Isolators with isoPower Integrated DC-to-DC Converter, 50mW. Data Sheet ADuM5240/ADuM5241/ADuM5242. Analog Devices. 2007-2012, 16 pages.

[No Author Listed], Isolated Flyback Converter without an Opto-Coupler Datasheet. Linear Technology, LT3573. 2008; 26 pages.

* cited by examiner

POWER TRANSFER AND FEEDBACK ACROSS A COMMON ISOLATOR

FIELD OF THE DISCLOSURE

The present disclosure relates to galvanic isolators and DC-DC converters.

BACKGROUND

Galvanic isolation between circuit components and transmission of data and power across an isolation barrier is sometimes provided for safety and/or data integrity considerations. Some isolated DC-DC converters include a driver that drives a primary winding of a transformer to transmit power to a secondary winding of the transformer across an isolation barrier.

SUMMARY OF THE DISCLOSURE

Isolated DC-DC converters are described. A DC-DC converter is a device which converts a direct current (DC) signal from one voltage to another. An isolated DC-DC converter performs the conversion across an electrical isolation barrier separating two voltage domains. The signal converted from one voltage to another, and transferred from one voltage domain to another, may be a power signal. Described are isolated DC-DC converters which transfer a power signal from one voltage domain to another via an isolator, and a power feedback signal back across the isolator. The isolator is a transformer in some situations.

In certain embodiments, an isolated DC-DC converter is provided, comprising a primary side circuit, a secondary side circuit, and a transformer having a primary coil coupled to the primary side circuit and a secondary coil coupled to the secondary side circuit, the primary and secondary coils being separated by an isolation barrier. The primary side circuit is configured to provide a power signal to the secondary side circuit via the transformer, and the secondary side circuit is configured to provide a feedback signal to the primary side circuit via the transformer.

In certain embodiments, a method of operating an isolated DC-DC converter is provided, comprising transferring a power signal from a primary side circuit of the isolated DC-DC converter to a secondary side circuit of the isolated DC-DC converter over a transformer, and transferring a power control feedback signal from the secondary side circuit to the primary side circuit over the transformer.

In certain embodiments, an isolated power transfer system for transferring power and a feedback signal over a common isolator is provided. The system comprises a transformer having a primary winding and a secondary winding, the primary and secondary windings being isolated from each other, a drive circuit coupled to the primary winding and configured to generate a power signal, and a rectifier circuit coupled to the secondary winding and configured to rectify the power signal received by the secondary winding from the primary winding. The system further comprises a feedback circuit coupled to the secondary winding and configured to provide a feedback signal to the secondary winding.

BRIEF DESCRIPTION OF THE DRAWINGS

Various aspects and embodiments of the application will be described with reference to the following figures. It should be appreciated that the figures are not necessarily drawn to scale. Items appearing in multiple figures are indicated by the same reference number in all the figures in which they appear.

DETAILED DESCRIPTION

Aspects of the present application provide an isolated DC-DC converter which uses a single communication channel to transfer both a power signal from a primary side to a secondary side and a feedback signal from the secondary side to the primary side. Using a single, common communication channel to transfer both types of signals allows for a reduction in components and space of the DC-DC converter compared to using separate communication channels for the different types of signals.

In some embodiments, the isolated DC-DC converter transfers signals between the primary and secondary sides using a transformer. The circuitry of the primary side and the circuitry of the secondary side may be coupled to the transformer in a manner sufficient to allow for the transfer of the power signal from the primary side to the secondary side and the feedback signal from the secondary side to the primary side over the transformer. Thus, use of multiple transformers to transfer the power signal and its corresponding feedback signal may be avoided. Because the transformer is, in at least some situations, the most costly component of an isolated DC-DC converter, providing for the transfer of a power signal and its corresponding feedback signal over a single transformer may provide significant cost savings.

Figure 1:
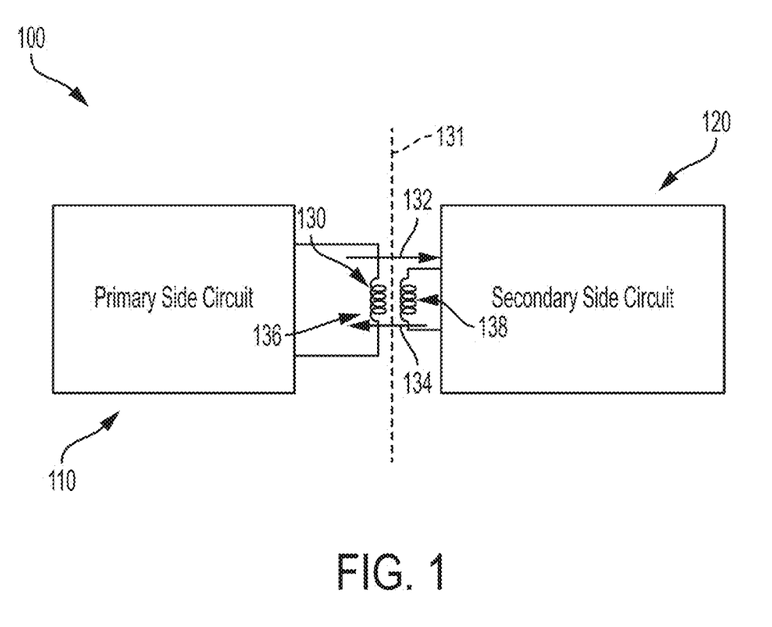
FIG. 1 illustrates an isolated power transfer system with an isolator which transfers a power signal and a feedback signal, according to an embodiment of the present application.

FIG. 1 illustrates an isolated power transfer system 100 according to an embodiment of the present application, and may represent an isolated DC-DC converter. The isolated power transfer system 100 includes an isolator which transfers both a power signal and a feedback signal, in opposite directions. In the illustrated example, the system 100 may include a primary side circuit 110, a secondary side circuit 120 and an isolator 130 bridging an isolation barrier 131. The primary side circuit 110 may transfer a power signal 132 through the isolator 130 to the secondary side circuit 120. The secondary side circuit 120 may transfer a feedback signal 134 through the isolator 130 to the primary side circuit 110, providing information about the power signal received by the secondary side circuit 120 from the primary side circuit 110. The feedback signal may be referred to as a power control feedback signal since it provides information to the primary side circuit to control power delivery to the secondary side circuit.

The primary side circuit 110 may be any suitable circuit for transmitting signals to the secondary side circuit 120. For example, the primary side circuit 110 may be a control circuit configured to control operation of the secondary side circuit 120. The primary side circuit may include signal generation circuitry, such as a driver, a clock circuit, and power generation circuitry, among other possibilities. The signal generation circuitry may include a resonant driver. In at least some embodiments, the primary side circuit 110 includes a power signal generator.

The secondary side circuit 120 may be any suitable circuit for receiving a power signal from the primary side circuit. In some embodiments, the secondary side circuit may include a rectifier for rectifying an alternative current (AC) signal received from the primary side circuit. Examples are illustrated in FIGS. 2 and 3 and described further below.

The isolator 130 may be a transformer, a micro-transformer, or any other suitable component providing galvanic isolation and signal transfer. For example, as shown in FIG. 1, the isolator 130 may be a transformer including a primary winding 136 and a secondary winding 138. The primary and secondary windings (or "coils") may be separated by isolation barrier 131, which may be a dielectric layer or any other suitable material and structure providing galvanic isolation. The primary and second windings may be microfabricated in some embodiments. Thus, in some embodiments the primary side circuit and/or the secondary side circuit may be microfabricated on the same substrate (e.g., a silicon substrate) as the isolator 130.

It should be appreciated that the isolator 130 represents a communication channel, allowing for exchange of signals between the primary side circuit 110 and the secondary side circuit 120. Thus, the isolated power transfer system 100 represents an example of a power transfer system which transfers both a power signal and a feedback signal over the same (or "common") communication channel.

Figure 2:
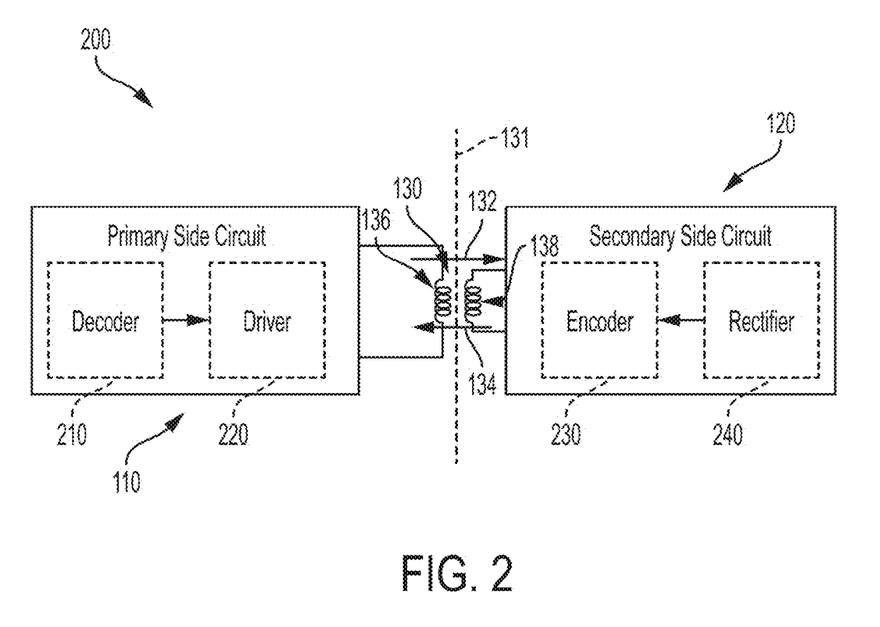
FIG. 2 shows a more detailed representation of an isolated power transfer system using a common isolator to transfer a power signal and a feedback signal, and which may represent an implementation of the isolated power transfer system of FIG. 1, according to an embodiment of the present application.
Figure 3:
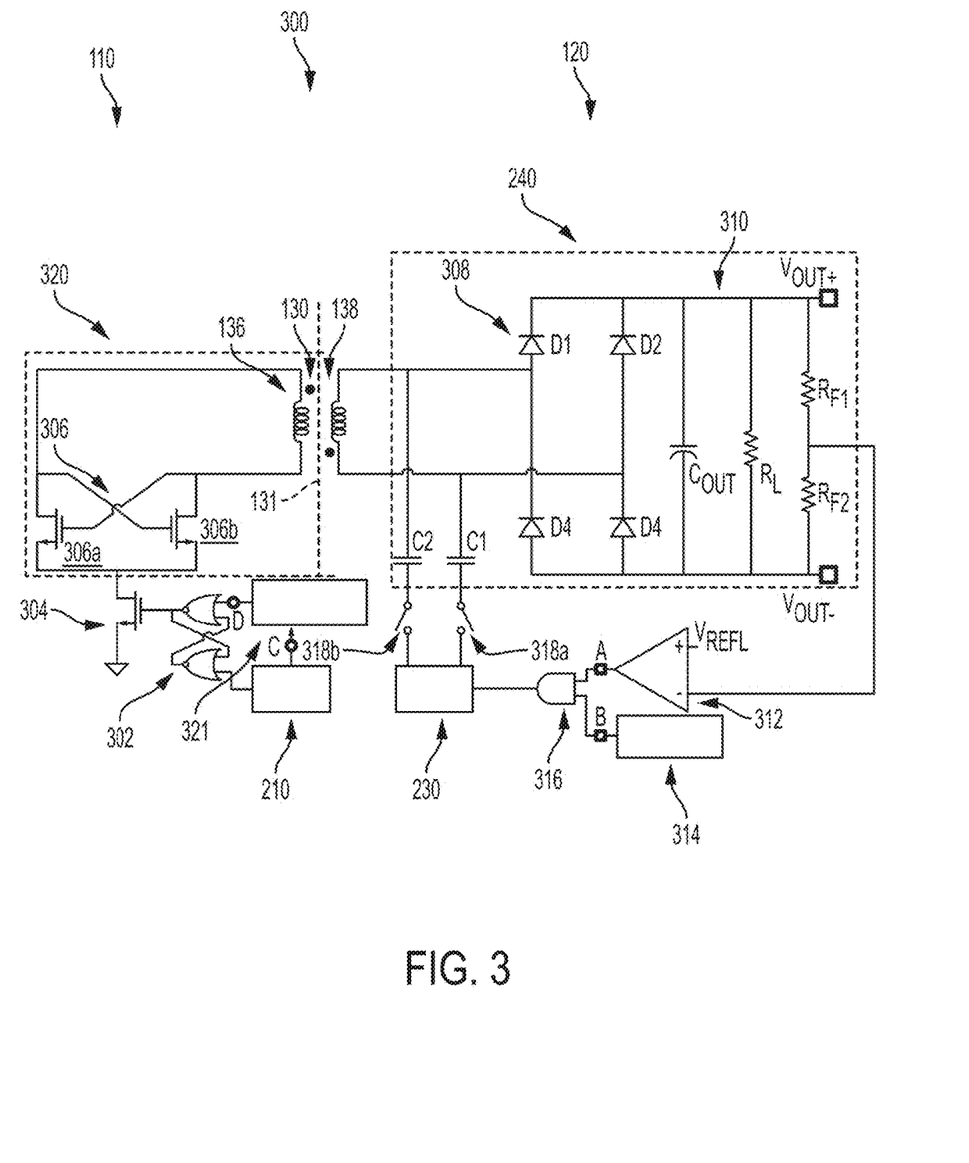
FIG. 3 shows an embodiment of an isolated power transfer system having an isolator which transfers a power signal and a feedback signal, and which may represent an implementation of the isolated power transfer system of FIG. 1.

FIG. 2 shows a more detailed representation of an isolated power transfer system using a common isolator to transfer a power signal 132 and a feedback signal 134, and which may represent an example of an implementation of the isolated power transfer system of FIG. 1. The isolated power transfer system 200 includes the primary side circuit 110, which may include a decoder 210 and a driver 220, and secondary side circuit 120, which may include an encoder 230 and a rectifier 240. Additional components may optionally be included in the primary side circuit 110 and/or secondary side circuit 120.

The decoder 210 may be any decoder system configured to decode messages sent by the encoder 230. Thus, the decoder 210 and encoder 230 may be configured as a complementary pair of circuits or devices to allow for suitable encoding/decoding of signals transferred across the isolator 130. In some embodiments, the encoder 230 is configured to encode a pulse frequency modulation (PFM) signal to send to the decoder 210 in the feedback signal 134.

In one embodiment, the encoder 230 may encode a rising edge of the PFM signal into two pulses and a falling edge of the PFM signal into a single pulse, although other PFM encoding schemes are possible. The decoder 210 may be configured to decode these types of encoded signals, as an example.

The encoder may be, or may form part of, a feedback circuit configured to provide the feedback signal 134 to the primary side circuit. In some embodiments, the feedback circuit includes additional components, examples of which are shown in FIG. 3 and described further below.

The driver 220 may be any driver circuit suitable for generating and transferring power and/or other signals over the isolator 130. In some embodiments, the driver 220 includes an oscillator. An example is illustrated in FIG. 3 and described further below.

The rectifier 240 may be any rectifier circuit suitable for rectifying power transferred over the isolator 130. The rectifier 240 may include any number of smoothing and/or filtering stages. An example is illustrated in FIG. 3 and described further below. In at least some embodiments, the rectifier 240 outputs a DC voltage, shown in FIG. 3.

As an example of the operation of the isolated power transfer system 200, the driver 220 may drive the power signal 132 across the primary winding 136 of the isolator 130 for a fixed period of time. The secondary winding 138 may receive the power signal and the rectifier 240 may convert it into an output voltage of the secondary side circuit 120. After the fixed amount of time elapses, the primary side circuit 110 may stop transmitting the power signal 132. When the output voltage falls below a certain threshold, the encoder 230 may send a feedback signal 134 to the primary side circuit 110 through the isolator 130. The decoder 210 may decode the feedback signal 134 and enable the primary side circuit 110 to begin transmission of the power signal 132 again.

The encoder 230 and decoder 210 may be any suitable pair to send information across the isolator 130. The information may be a single signal to indicate that the primary side circuit 110 should be activated. In other embodiments, the encoder 230 may encode one or more signals of a set of possible signals to be sent to the decoder 210. The set may include signals representing instructions to turn off the primary side circuit 110, change the turn on time of the primary side circuit 110, or any other information that the primary side circuit 110 could use. Other components may be used with the decoder 210 to help interpret the one or more signals from the set of signals, to be used by or with the primary side circuit 110.

FIG. 3 shows one possible implementation of an isolated power transfer system using a single isolator to transfer both a power signal and a corresponding feedback signal. The isolated power transfer system 300 represents an example implementation of the isolated power transfer systems 100 and 200 of FIGS. 1 and 2.

The primary side circuit 110 of isolated power transfer system 300 may include a driver 320 and a decoder 210 connected to the driver 320 through a latch 302 and a tail transistor 304. The driver 320, which represents a non-limiting example of driver 220 of FIG. 2, may comprise a pair of cross-coupled transistors 306a and 306b connected to the primary winding 136 of isolator 130. The parasitic capacitance of the cross coupled transistors 306a and 306b within the driver 320, in combination with the primary-side inductor of the isolator 130, may serve as an LC tank circuit. The cross coupling 306 may further generate a negative resistance to cancel the parasitic resistance of the primary-side inductor of the isolator 130. The use of cross coupled transistors 306a and 306b should not be considered a limitation of the driver 320, as any LC tank circuit may be used in the driver 320.

The isolated power transfer system 300 further comprises a mono-stable flip flop 321 coupled to the decoder 210 and the latch 302. As will be described further below, the latch controls operation of the tail transistor 304 based on inputs received from the decoder 210 and the mono-stable flip flop 321. The latch 302 represents a non-limiting example of a logic trigger circuit for triggering operation of the driver. Other logic circuits, and, more generally, other types of circuits may be used in alternative embodiments.

The output signal from the latch 302 turns the tail transistor 304 ON and OFF, to enable the driver 320. Whether the latch 302 enables or disables the driver 320 depends on the feedback signal received and decoded by the decoder 210. The decoder 210 may monitor the primary side inductor of the isolator 130 when the oscillations of the driver 320 are low, and may detect a signal from the encoder 230. The latch 302 is shown as an SR latch, but may be implemented by any logic gate, so that the combination of signals from the decoder 210 and the mono-stable flip-flop 321 may control the operation of tail transistor 304. The tail transistor may control the LC tank circuit of the driver 220, thereby controlling the transfer of power from the primary side circuit 110 to the secondary side circuit 120.

In the non-limiting example of FIG. 3, the secondary side circuit 120 is illustrated as including a rectifier 240 connected to the encoder 230 through a comparator 312, an oscillation detector 314, and a logic gate 316. The encoder 230 may connect back to the rectifier 240 and/or isolator 130 through a pair of switches 318a and 318b.

In this example, the rectifier 240 may include a full bridge rectifier 308 as well as a filter 310 to smooth the output voltage Vout. The full bridge rectifier may comprise diodes D1, D2, D3, and D4. The filter 310 may include capacitor $C_{OUT}$, and resistors $R_L$, $R_{F1}$, an $R_{F2}$. However, any suitable rectifier may be used, and any number and type of filters may be used, as the various aspects described herein are not limited to isolated DC-DC converters having any particular type of rectifier or filter.

The comparator 312 may be any suitable comparator for comparing the output voltage Vout of the isolated DC-DC converter, or a variation thereof (e.g., an amplified or divided version of the output voltage), to a reference voltage $V_{REFL}$. The comparison allows the output voltage to be maintained within a certain allowable, or target range.

The oscillation detector 314 is configured to control when the feedback signal is transferred from the secondary side circuit 120 to the primary side circuit 110 relative to operation of the driver 320. The oscillation detector 314 is coupled to an input of gate 316 together with the comparator 312. The output signal from gate 316 enables or disables the encoder, and thus whether the encoder is enabled or disabled depends on the state of the comparator 312 and the oscillation detector 314. The oscillation detector 314 is configured to detect oscillations of the power received by the secondary side circuit 120. The oscillations of the power in the secondary side circuit 120 directly correspond to the oscillations of the driver 320 within the primary side circuit 120. In this manner, the oscillation detector 314 may detect a state of the driver 320. Thus, by detecting oscillation of the power in the secondary side circuit 120, the oscillation detector 314 may enable the encoder 230 at a time when the primary side circuit 110 has stopped transferring power to the secondary side circuit 120 to allow the output Vout of the secondary side circuit 120 to stay below a maximum acceptable level. Thus, in this example, the oscillation detector may alter the state of the feedback circuit based on the state of the driver 320. While the isolated power system 300 illustrates an example in which the oscillator detector 314 monitors the output of the secondary side circuit 120 to determine when to enable or disable provision of a feedback signal, alternative constructions are possible. For example, in an alternative embodiment the oscillation detector 314 may detect the oscillations at the input of the secondary side circuit 120 directly.

In one embodiment, the logic gate 316, which may be an AND gate in some non-limiting embodiments, enables the encoder 230 when the output of the comparator 312 goes high, when Vout is greater than Vrefl, and the oscillation detector 314 indicates that the oscillation of the driver 320 is currently low. Once the encoder 230 is enabled, it may connect at least one or more of the switches 318a and 318b, to apply the encoded signal across the secondary side inductor of the isolator 130. The connection between switch 318a and the isolator 130 may include a capacitor C1. The connection between switch 318b and the isolator 130 may include a capacitor C2.

Figure 4:
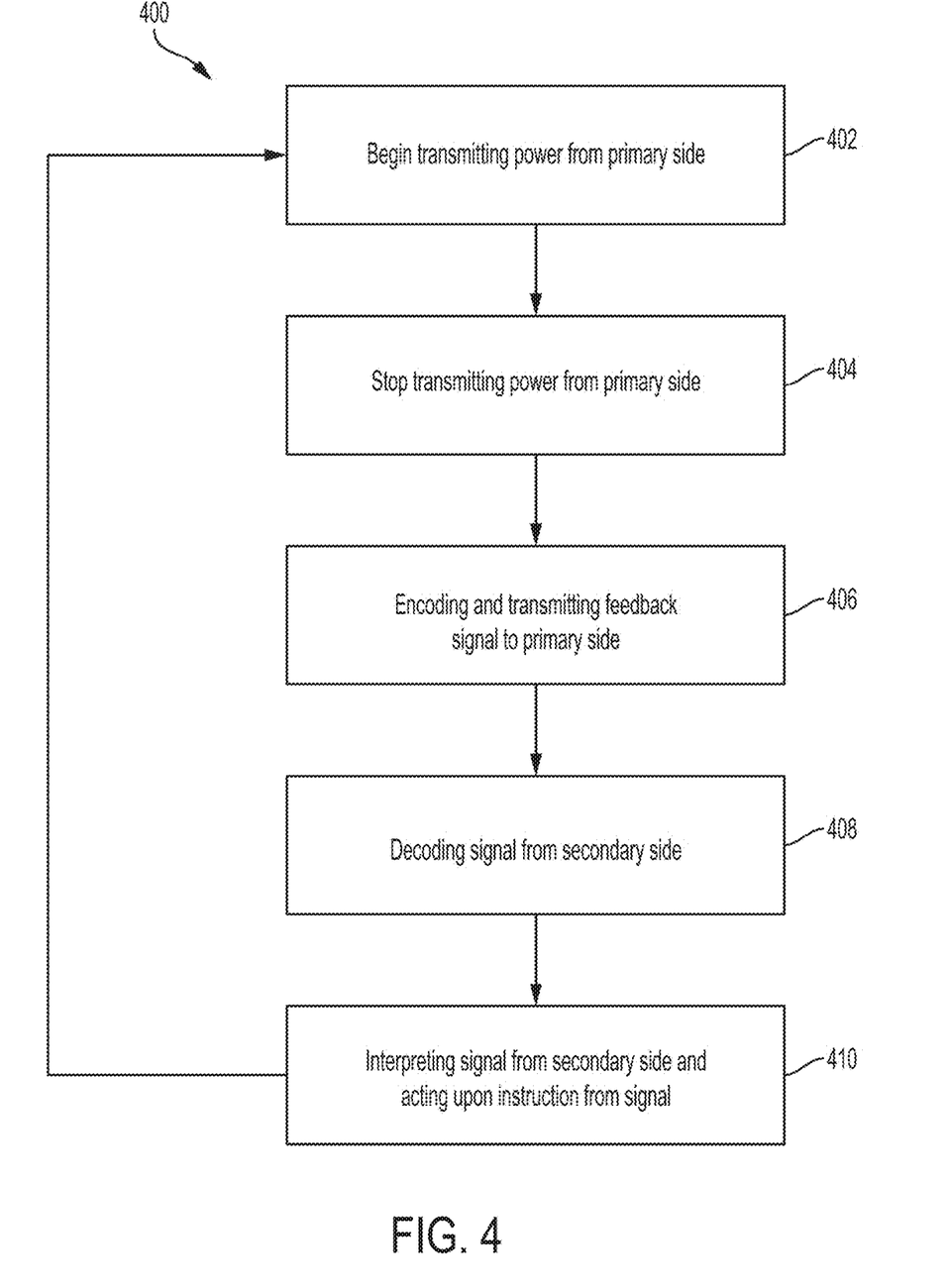
FIG. 4 shows a flowchart of a method for isolated power transfer involving transferring a power signal and a feedback signal over a common isolator, according to an embodiment of the present application, and which may be employed by the isolated power transfer systems described herein.

FIG. 4 shows a flowchart of a method 400 for power transfer involving transferring a power signal and a feedback signal over a common isolator, according to an embodiment of the present application. The illustrated method may be employed by the isolated power transfer systems of FIGS. 1-3, as an example.

The method 400 may begin at act 402 with transferring a power signal from the primary side circuit of an isolated power transfer system to a secondary side circuit. In act 404, transmission of the power signal may be terminated, at least temporarily. In some embodiments, the primary side circuit may stop transmitting the power signal after a fixed time. Also, the primary side circuit may stop transmitting the power signal once the output voltage of the secondary side circuit reaches a threshold voltage, as determined by provision of a feedback signal from the secondary side circuit or in any other suitable manner.

In act 406, the secondary side circuit may encode and transmit a feedback signal to the primary side circuit over the same isolator as that used to transfer the power signal. In some embodiments, an encoder of the secondary side circuit may generate, or encode the feedback signal, although not all embodiments are limited in this respect. In some embodiments, the feedback signal is transferred over the isolator once the output voltage of the secondary side circuit reaches a reference voltage. In some embodiments, the feedback signal is encoded as a PFM signal by the encoder.

In act 408, the primary side circuit may receive and decode the feedback signal from the secondary side circuit. The feedback signal may indicate whether the voltage on the secondary side circuit exceeds a reference voltage, falls below a reference voltage, or otherwise is indicative of a state of operation calling for a change in the provision of the power signal from the primary side circuit.

In act 410 the signal from the secondary side circuit may be interpreted and then acted upon. In some embodiments, in act 410 the decoder 210 may enable the primary side circuit 110 to transmit the power signal 132 through control of the logic gate 302 and/or tail transistor 304. In other embodiments, the signal from the secondary side may cause a different action to be taken by the primary side circuit, such as shutting down or changing oscillation durations.

The ordering of the acts of method 400 may be altered. For example, in some embodiments, act 406 may happen before act 404. Other alternatives are also possible.

Figure 5A:
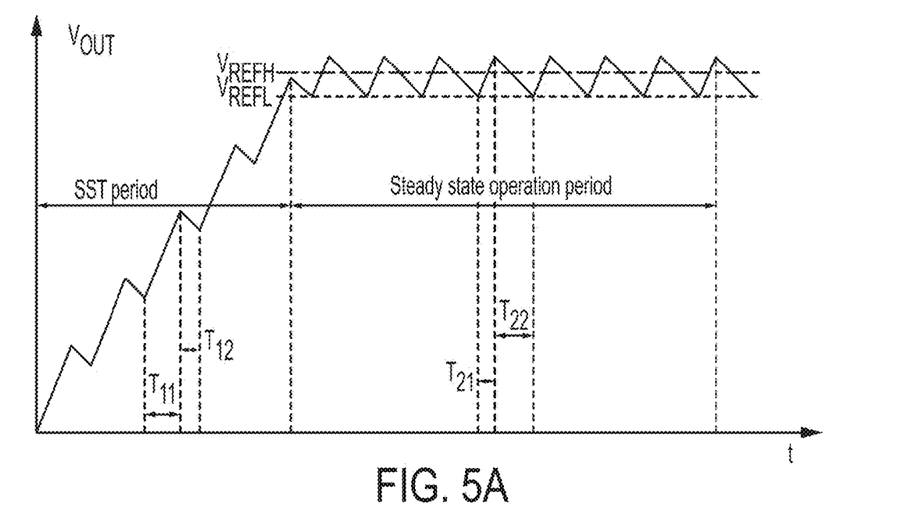
FIG. 5A shows an example of an output voltage as a function of time for a secondary side circuit of an isolated power transfer system of the types described herein.

FIG. 5A shows the soft start time (SST) startup and steady state waveform of the output voltage Vout of a secondary side circuit of an isolated power transfer system, according to a non-limiting embodiment of the present application. For purposes of illustration, the signal progression is described with reference to the circuit components of FIG. 3, although the other isolated power transfer systems described herein may produce the same signal progression in some embodiments. For example, the illustrated voltage Vout may be provided by the secondary side circuit 120 of FIG. 3. The x-axis of FIG. 5A represents time (t).

As shown, the soft start time startup operation may begin with Vout at zero when the power transfer system is off (t=0). Vout may then increase in stages corresponding to the driver 320 cycling ON and OFF. That is, Vout increases when driver 320 is ON and a power signal is transferred from the primary side circuit to the secondary side circuit. Vout decreases when driver 320 is OFF and no power signal is transferred from the primary side circuit to the secondary side circuit. In the illustrated figure, the voltage Vout assumes a saw tooth pattern corresponding to the driver 320 cycling ON and OFF. The duration of the signal increases, corresponding to the duration of driver 320 being ON, is labeled as T11 in the figure, and may be fixed throughout operation by the mono-stable flip flop 321. In some embodiments, during the soft start time (SST), the OFF time, T12, may be fixed as well. The output voltage Vout may rise during the SST until it reaches or rises above the reference voltage level Vrefl.

At this point, the power transfer system may enter a steady state operation period, where the ON time T21 may remain fixed. The OFF time T22 may no longer be fixed as the secondary side circuit 120 monitors the output voltage Vout. When Vout≤Vrefl and the oscillations of the primary side circuit 110 are off, the secondary side circuit 120 may send a pulse to the primary side circuit 110 to enable the mono-stable flip-flop 321 which may in turn enable the driver 220 to resume the power transfer for a fixed ON time T21. At the end of the fixed ON time T21 the output voltage Vout may begin to decay down towards the reference voltage Vrefl as the power transfer stops.

Figure 5B:
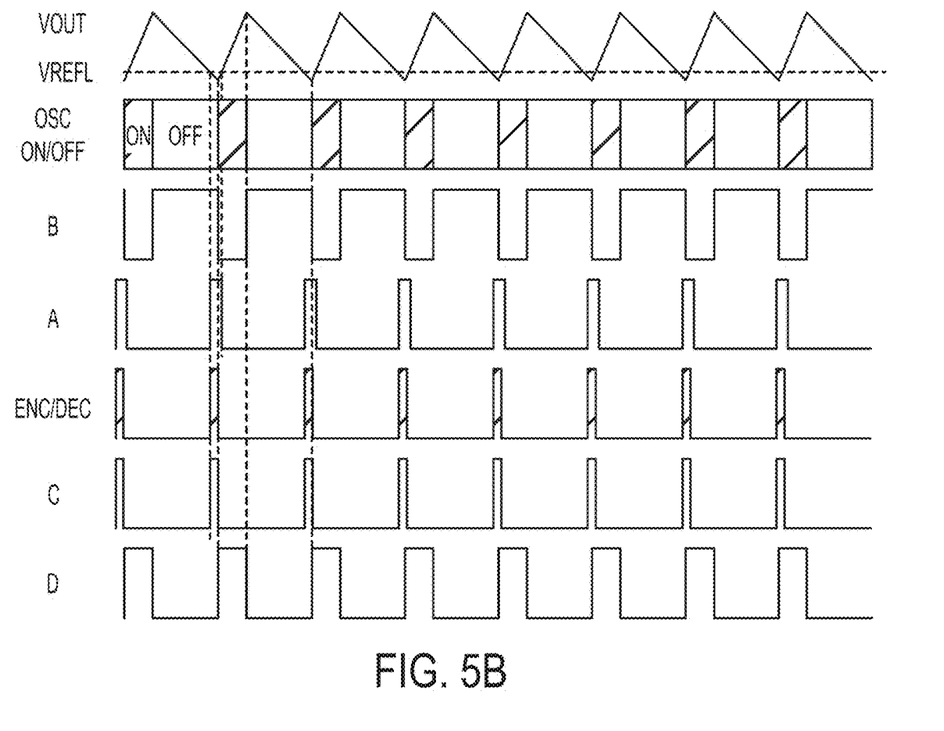
FIG. 5B shows a system timing diagram of an isolated power transfer system, according to an embodiment of the present application.

FIG. 5B shows a timing diagram of one embodiment of the power transfer system 300 during steady state operation. The waveforms of the timing diagram are idealized, and should not be considered a limitation of the system. OSC ON/OFF may represent the enablement of the oscillations of the driver 320. A may represent the output of the comparator 312, B the output of the oscillation detector 314, C the output of the decoder 210, and D the output of the mono-stable flip-flop 321, as illustrated in FIG. 3, for example. Vout may represent the output voltage of secondary side circuit 120. ENC/DEC may represent communication between the encoder 230 and the decoder 210. Waveform B may be the inverse of the OSC ON/OFF, as in some embodiments the oscillation detector may be high when the oscillations of the driver 220 of the primary side circuit 110 may be low.

Waveform A, the output of the comparator 312, may be high when Vout is below the reference voltage Vrefl. In other embodiments, a different logic gate 316 may be used, and in some embodiments a logic gate may be used for which waveform A is inverted compared to the illustrated waveform. ENC/DEC may be high when the output from the comparator 312 goes high, that is when waveform A switches from low to high voltage. In some embodiments, ENC/DEC may go high when waveform A switches from high to low voltage. Waveform C may go high when ENC/DEC goes high, as the decoder 210 will output once it has received communication from the encoder 230. Waveform D is an approximately constant clock cycle of the mono-stable flip-flop 321 that may control the cycles of the primary side circuit 110. In some embodiments, the waveforms may switch relative to rising and falling edges instead of high and low voltage levels.

Figure 6:
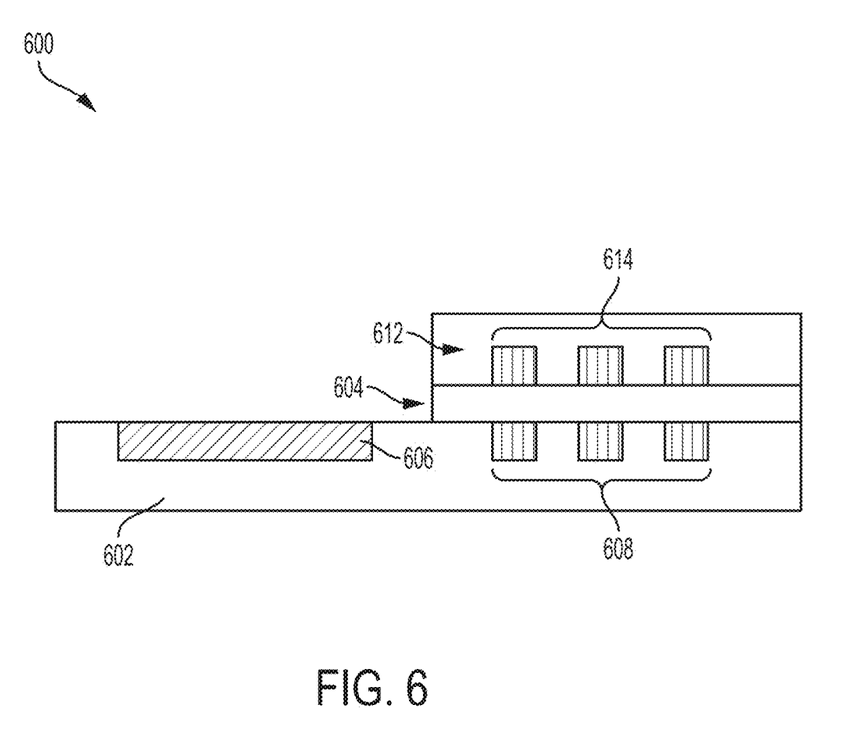
FIG. 6 illustrates an isolated power transfer system having components fabricated on a common substrate, according to an embodiment of the present application.

In some embodiments, the primary side circuit 110, the secondary side circuit 120 and/or the isolator 130 may be microfabricated. FIG. 6 shows one exemplary microfabricated system 600. The microfabricated system 600 may include a primary side substrate 602 and a dielectric layer 604. The primary side substrate may contain a primary side circuit 606, such as an integrated circuit, and a primary winding 608. A secondary winding 614 may be embedded in an insulating layer 612.

The primary side circuit 606 may be any of the primary side circuits described herein, or other suitable primary side circuits of DC-DC converters. The primary side circuitry 606 may be microfabricated, for example using silicon circuitry. The primary side substrate 602 may be a silicon substrate or a complementary metal oxide semiconductor (CMOS) substrate, among other possibilities.

The primary winding 608 may be formed of metal deposited in or on the substrate 602 and patterned into a desired contour. The primary winding 608 may be connected to and controlled by the primary side circuit 606. The secondary winding 614 may be of the same type as the primary winding in at least some embodiments, and may be formed within or covered by insulating layer 612. The secondary winding 614 may be coupled to a secondary side circuit on another substrate (not shown).

The dielectric layer 604 may be any suitable dielectric providing galvanic isolation between the primary and secondary windings. For example, silicon oxide, polyimide, or other materials may be used, in a single layer or multi-layer configuration.

Thus, FIG. 6 illustrates an example in which a microtransformer may be monolithically integrated with a primary side circuit of a power transfer system of the types described herein.

The isolated DC-DC converters described herein may be used in various applications. For example, automotive, consumer electronics, industrial, and healthcare applications may all make use of the technology described herein.

Figure 7:
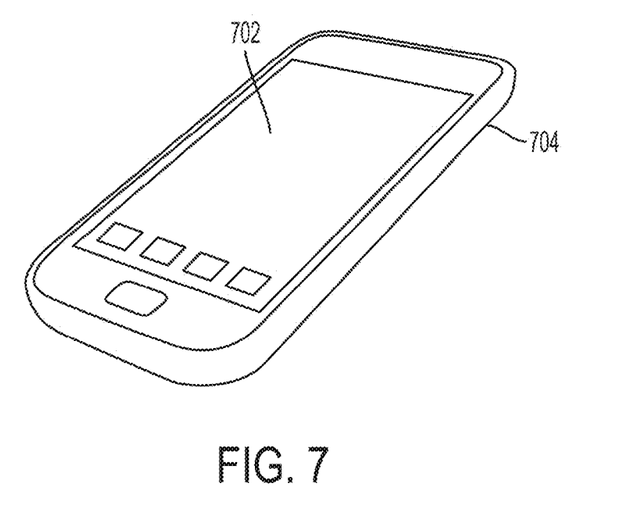
FIG. 7 is a schematic diagram showing an exemplary application of an apparatus in a portable electronic device setting, according to some embodiments.

FIG. 7 is a schematic diagram showing an exemplary application of an apparatus in a portable electronic device setting, according to some embodiments. An isolated DC-DC converter 702 may be used in a portable electronic device 704. The portable electronic device 704 may be smartphone, personal digital assistance (pda), tablet, or other portable device. Other such devices may also make use of DC-DC converters of the types described herein.

While FIG. 7 illustrates an example of a portable electronic device incorporating aspects of the present application, other uses are possible. For example, one or more isolated DC-DC converter devices may be employed in an automobile or a medical instrument. Various embodiments of the present application may be implemented to provide high compact, cost-effective DC to DC power conversion.

The various aspects described herein may provide various benefits. Some such benefits have been described previously herein. Not all embodiments provide every benefit, and benefits other than those listed may be provided. In some embodiments, an isolated DC-DC converter is provided with a simplified circuit design. The simplified circuit design may save space on a printed circuit board and/or reduce manufacturing costs by using a common isolator to transfer power and feedback signals in opposite direction. Some embodiments may be more power efficient through the use of PFM control.

The terms "approximately" and "about" may be used to mean within ±20% of a target value in some embodiments, within ±10% of a target value in some embodiments, within ±5% of a target value in some embodiments, and yet within ±2% of a target value in some embodiments. The terms "approximately" and "about" may include the target value.

What is claimed is:

1. An isolated DC-DC converter, comprising:
   a primary side circuit;
   a secondary side circuit configured to generate an output voltage;
   a comparator in the secondary side circuit configured to compare the output voltage with a reference voltage; and
   a transformer having a primary coil coupled to the primary side circuit and a secondary coil coupled to the secondary side circuit, the primary and secondary coils being separated by an isolation barrier,
   wherein the primary side circuit is configured to provide a power signal to the secondary side circuit via the transformer,
   wherein the secondary side circuit comprises an oscillation detector, and encoder that is switchably coupled to the secondary coil of the transformer in dependence on an output signal of the oscillation detector,
   and wherein the secondary side circuit is configured to provide a feedback signal to the primary side circuit through the transformer in response to an indication from the comparator that the output voltage crosses the reference voltage.

2. The isolated DC-DC converter of claim 1, wherein the encoder is configured to produce the feedback signal, wherein the feedback signal is an encoded signal.

3. The isolated DC-DC converter of claim 2, wherein the primary side circuit comprises a decoder coupled to the primary coil of the transformer and configured to receive and decode the feedback signal.

4. The isolated DC-DC converter of claim 3, wherein the primary side circuit further comprises a tank circuit and a logic trigger circuit, wherein the logic trigger circuit is coupled between the decoder and the tank circuit.

5. The isolated DC-DC converter of claim 1, wherein the primary side circuit is an integrated circuit and wherein the transformer is a microtransformer integrated on a same substrate as the primary side circuit.

6. The isolated DC-DC converter of claim 1, wherein the primary side circuit is configured to generate the power signal as a pulse frequency modulated (PFM) signal.

7. The isolated DC-DC converter of claim 1, wherein the primary side circuit comprises a resonant drive circuit, and wherein the oscillation detector is configured to detect when the primary side circuit is providing the power signal.

8. The isolated DC-DC converter of claim 1, wherein the secondary side circuit further comprises a rectifier circuit coupled to the encoder and to the secondary coil of the transformer.

9. The isolated DC-DC converter of claim 1, wherein the encoder is coupled to the secondary coil via a pair of switches, and wherein each of the pair of switches is coupled to the secondary coil of the transformer via a capacitor.

10. A method of operating an isolated DC-DC converter, comprising:
    transferring a power signal from a primary side circuit of the isolated DC-DC converter to a secondary side circuit of the isolated DC-DC converter over a transformer;
    comparing, with a comparator, an output voltage of the secondary side circuit with a reference voltage;
    detecting, with a detector in the secondary side circuit, an oscillation state of the primary side circuit; and
    in response to an indication from the comparator that the output voltage crosses the reference voltage and an output signal of the detector, transferring a power control feedback signal from the secondary side circuit to the primary side circuit over the transformer.

11. The method of claim 10, further comprising generating the power control feedback signal as an encoded signal using an encoder of the secondary side circuit.

12. The method of claim 11, further comprising receiving and decoding the power control feedback signal using a decoder of the primary side circuit.

13. The method of claim 12, further comprising using a logic trigger circuit coupled to an output of the decoder to trigger a tank circuit of the primary side circuit.

14. The method of claim 10, further comprising generating the power signal on a substrate on which a primary coil of the transformer is disposed.

15. The method of claim 10, further comprising generating the power signal as a pulse frequency modulated signal using the primary side circuit.

16. The method of claim 10, further comprising monitoring, with the secondary side circuit, timing of the transfer of the power signal from the primary side circuit and performing the transferring of the power control feedback signal during a break in transferring the power signal.

17. An isolated power transfer system for transferring power and a feedback signal over a common isolator, the system comprising:
    a transformer having a primary winding and a secondary winding, the primary and secondary windings being isolated from each other;
    a drive circuit coupled to the primary winding and configured to generate a power signal;
    a rectifier circuit coupled to the secondary winding and configured to rectify the power signal received by the secondary winding from the primary winding and to generate an output voltage; and a feedback circuit coupled to the secondary winding and to the rectifier circuit, the feedback circuit comprising:
        a comparator configured to compare the output voltage with a reference voltage,
        an encoder coupled in parallel with the secondary winding and the rectifier circuit, the encoder configured to produce an encoded feedback signal, and
        a detector configured to detect a state of the drive circuit and to alter a state of the feedback circuit in dependence on the state of the drive circuit, wherein:
    the feedback circuit is configured to provide the encoded feedback signal to the secondary winding in response to an indication from the comparator that the output voltage crosses the reference voltage; and
    a decoder coupled to the primary winding and configured to receive and decode the encoded feedback signal.

18. The isolated power transfer system of claim 17, wherein the drive circuit and the transformer are monolithically integrated on a same substrate.

* * * * *

UNITED STATES PATENT AND TRADEMARK OFFICE
CERTIFICATE OF CORRECTION

PATENT NO. : 10,680,526 B2
APPLICATION NO. : 15/406014
DATED : June 9, 2020
INVENTOR(S) : Yue Zhuo et al.

Page 1 of 1

It is certified that error appears in the above-identified patent and that said Letters Patent is hereby corrected as shown below:

In the Claims

At Column 9, Line 30 delete "and encoder" and replace it with -- and an encoder --.

Signed and Sealed this
Tenth Day of November, 2020

Andrei Iancu
*Director of the United States Patent and Trademark Office*